United States Patent [19]
Fontaine

[11] 3,874,629
[45] Apr. 1, 1975

[54] FLUID OPERATED NEEDLE VALVE

[75] Inventor: John G. Fontaine, Fort Lauderdale, Fla.

[73] Assignee: Fail Safe Brake Corporation, Fort Lauderdale, Fla.

[22] Filed: Aug. 6, 1973

[21] Appl. No.: 385,972

Related U.S. Application Data

[63] Continuation-in-part of Ser. No. 211,481, Nov. 23, 1971, abandoned.

[52] U.S. Cl. .............................. 251/61.4, 251/61.5
[51] Int. Cl. ......................................... F16k 31/365
[58] Field of Search .......... 251/61, 61.1, 61.2, 61.3, 251/61.4, 61.5, 122, 368, 63.5, 63.6; 169/17, 20

[56] References Cited
UNITED STATES PATENTS

| | | | |
|---|---|---|---|
| 1,099,389 | 6/1914 | Morrison | 251/368 |
| 2,390,134 | 12/1945 | Svirsky | 251/368 |
| 2,391,605 | 12/1945 | Walton | 251/61.1 |
| 2,446,051 | 7/1948 | Leslie | 251/61.5 |
| 2,564,569 | 8/1951 | Goehring | 251/61.4 |
| 2,665,711 | 1/1954 | Parks | 251/61.5 |
| 2,770,251 | 11/1956 | Goodard et al. | 251/61.5 |
| 2,882,007 | 4/1959 | Conlan | 251/61.5 |
| 3,047,003 | 7/1962 | Gurney | 251/62 |
| 3,048,274 | 8/1962 | Lundeen | 251/61.4 |
| 3,269,411 | 8/1966 | Teston | 251/368 |
| 3,298,396 | 1/1967 | Gressman et al. | 251/368 |
| 3,512,550 | 5/1970 | Ammann | 251/61.5 |
| 3,672,628 | 6/1972 | Aanstad | 251/63.6 |
| 3,785,440 | 1/1974 | Shea | 251/61.2 |

FOREIGN PATENTS OR APPLICATIONS

| | | | |
|---|---|---|---|
| 1,113,857 | 9/1961 | Germany | 251/61.2 |

*Primary Examiner*—Martin P. Schwadron
*Assistant Examiner*—George L. Walton
*Attorney, Agent, or Firm*—Oltman and Flynn

[57] ABSTRACT

A fluid-operated needle valve having a fluid displaceable actuator reciprocable in one housing and a needle valve reciprocable in another housing. The two housings are detachably secured to each other. One or more plungers act between the actuator and the tip of the needle valve so that movement of the actuator seats or unseats the needle valve.

1 Claim, 4 Drawing Figures

FLUID OPERATED NEEDLE VALVE

BACKGROUND OF THE INVENTION

Known valves which are capable of automatic operation commonly suffer the drawback that fluid under high pressure at the orifice of the valve tends to bypass the plug when the valve is closed. Many such automatic valves are of the solenoid or magnetic type, and when such valves are subject to more than 150° F., the electrical resistance of the coil increases causing the valve to malfunction. Applications exist where an automatic valve is required to operate continuously under both high pressure and high temperature conditions without permitting any bypass and/or leakage of fluid.

It is also known that valves commonly referred to as needle valves will seal fluid at the orifice under high pressure and/or high temperature, and will not leak or bypass. However, such valves are (a) manually controlled; (b) require a number of turns to either close or open which consumes time; (c) are not generally adaptable for automatic equipment that usually requires valves to be opened or closed in less than one second; and (d) tend to have a short life because the valve seats and valve plugs soon become scored and distorted, and threads associated with such valves soon become worn, at which time the valves will leak and bypass fluid.

SUMMARY OF THE INVENTION

It is the general purpose of the present invention to combine the advantages of needle valves with fluid pressure operation. The valve of the present invention is a fluid operated needle valve including a needle element having a conical tip with an acute included angle for opening and closing the valve seat, and a reciprocable actuator for actuating the needle element by a change of fluid pressure acting on the actuator. The fluid-displaceable actuator and the needle element are in individual housings that are detachably secured to each other. The needle element will close the orifice within the valve seat and seal it bubble tight against leakage or bypass of the fluid in the orifice, even under high pressure and/or high temperature conditions. The actuator for the needle element is characterized by gentle operation which, although quick, reduces the tendency of needle valves to deteriorate as by scoring, pitting, warpage or other effects.

Accordingly, it is an object of the present invention to provide an automatic valve capable of operating continuously under both high pressure and high temperature conditions without permitting any bypass and/or leakage of fluid.

Another object of the invention is to provide such a valve that will close and seal a fluid (liquid or gas) without leakage or bypass.

Another object of the invention is to provide a valve as just described which will continue to operate for many cycles, say millions of cycles, without warpage, pitting, scoring or other deterioration of the plug and seat.

Another object of the invention is to provide an automatic valve characterized by gentle opening and closing of a needle element included in the plug of the valve.

Still another object of the invention is to provide a valve that can be operated manually, remotely, and/or automatically, powered by fluid which may be liquid or gas, either under pressure or under vacuum.

A further object of the invention is to provide a fluid operated needle valve in which the needle element makes its own seat.

Other objects of this invention will appear from the following description and appended claims, reference being had to the accompanying drawings forming a part of this specification wherein like reference characters designate corresponding parts in the several views.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

DETAILED DESCRIPTION

Figure 1:
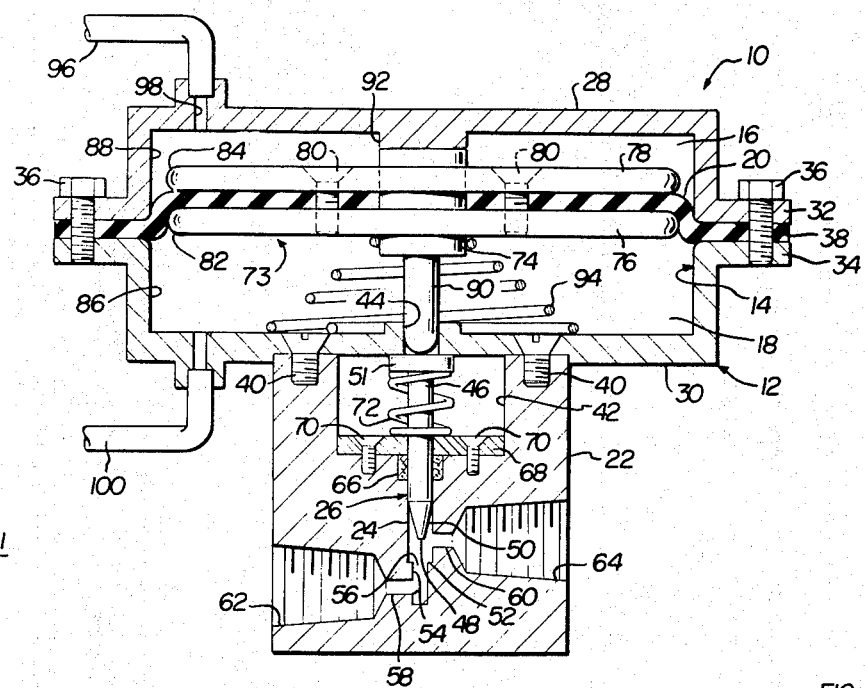
FIG. 1 is a vertical cross sectional view of a fluid operated needle valve in accordance with one embodiment of the invention, this embodiment being a normally open type of valve.

Referring first to FIG. 1, the fluid operated needle valve 10 is a normally open type. The valve 10 includes an upper housing generally designated 12, which has a chamber 14 divided into an upper compartment 16 and a lower compartment 18 by a fluid displaceable, reciprocable actuator which in this instance is a flexible, resilient diaphragm 20. A lower housing 22 has a cylindrical passage 24 slidable receiving a plunger 26.

Referring again to the upper housing 12, in this particular embodiment of the invention, it includes an upper cup 28 and a lower cup 30 which have flanges 32 and 34 facing each other and joined together by bolts 36. The peripheral edge of the diaphragm 20 at 38 is received between the flanges 32 and 34, and provides a seal which prevents fluid from leaking out of the compartments 16, 18.

The lower housing 22 consists, in this embodiment, of a block of metal which is fastened to cup 30 as with screws 40. The block 22 has a cavity 42 extending downwardly from its upper surface, and the passage 24 is a counterbore which communicates with the cavity 42 and also communicates via an opening 44 in cup 30 with the lower compartment 18.

The plunger 26 includes a valve stem 46, needle means 48 at the lower end of the valve stem, and head means 51 at the upper end of the valve stem. The needle means 48 comprises a conical surface 50 which forms a conical tip on the valve stem.

A valve seat 52 is formed in the block 22. The valve seat 52 is formed by providing a cylindrical bore 54 in the block 22 communicating with counter bore 24 but of a smaller diameter so as to form a sharp-cornered, upwardly-facing, circular shoulder at the valve seat 52. The bore surface 54 may be cylindrical even at the shoulder 52, so that the angle of the surface 54 relative to the axis of the bore may be zero degrees. However, the surface of the bore at the valve seat 52 could be made conical, if desired. In any event, the included angle of the surface at the valve seat 52 should be less than the included angle of the conical tip surface 50 so that the needle means 48 exerts a wedging action on the valve seat 52 when it is initially closed. This wedging action compresses the material at the valve seat 52 so that the needle means forms its own seat. To facilitate this, the material of the block 22 may be made softer than the hard material of the needle means 48. For example, the needle means 48, and in fact the whole valve stem 46, may be made of hard steel, and the valve seat 52, and in fact the whole block 22, may be made of a softer material, such as brass.

The included angle of the conical tip surface 50 should be less than 90°; that is, the included angle of the conical tip 50 should be an acute angle. It is best to make this angle of the order of 30°, say between 20° and 40°. The conical tip surface 50, when it is closed against the valve seat 52, will close the orifice 56 within the valve seat 52 tightly so that fluid (gas or liquid) at the orifice will not leak past the needle means 48. No leakage or bypassing of fluid will occur even in high temperature or high pressure conditions.

The orifice 56 is in a flow path which also includes lateral openings 58 and 60. The openings 58 and 60 communicate respectively with threaded recesses 62 and 64 to which piping or conduit may be connected. Thus, the needle means 48 serves to open and close the orifice 56 within the valve seat 52 for controlling the flow of fluid (liquid or gas) in the flow path that includes openings 58 and 60. When the needle means 48 is closed against the valve seat 52, there will be no leakage or bypassing of fluid between the openings 58 and 60.

The valve stem 46 is slidably received in the passage 24 for longitudinal movement relative to that passage. The valve stem 46 and the passage 24 are sealed by packing 66 which may be ordinary packing or an O-ring if desired. The packing 66 is compressed by a gland 68 which may be a disc secured to the block 22 as with screws 70.

The head 51 of the plunger 26 may simply be an enlarged portion of the valve stem 46 at the top thereof. The head 51 is preferably urged upward against the bottom of the cup 30 by a coil spring 72 which is normally under slight compression. This keeps the needle means 48 normally open.

The diaphragm 20 is preferably a rubbery material such as neoprene or butyl rubber. The diaphragm 20 is coupled to the plunger 26 by means of a piston 73 which includes a piston body 74 having an enlarge disc 76 on the lower side of the diaphragm 20, and an upper disc 78 on the upper side of the diaphragm 20 and connected to the lower disc as with screws 80. The perimeters 82 and 84 of the discs 76 and 78 are spaced from the cylindrical walls 86 and 88 of the cups 30 and 28 by about the thickness of the diaphragm 20 so that the diaphragm can be stretched vertically upward or downward in the space between perimeters 82, 84 and walls 86, 88. The body 74 has a downwardly projecting plunger 90 which contacts the head 51 of the plunger 26. The piston and diaphragm are urged upwardly to a rest position wherein the body 74 contacts a boss 92 on cup 28 by a spiral coil spring 94 having ends abutting the disc 76 and the bottom of cup 30. The coil spring 94 is normally under slight compression.

A conduit 96 communicates through an opening 98 with the upper compartment 16, and another conduit 100 communicates through an opening 102 with the lower compartment 18. Only one of these conduits is needed, but two conduits 96 and 100 have been shown here to illustrate that the actuating force may be applied to either of the compartments 16 and 18. For example, liquid or gas under pressure can be introduced through conduit 96 to the chamber 16 to force the diaphragm 20 downwardly and thus force the plunger 26 downward causing the needle means 48 to close against the valve seat 52. On the other hand, a reduced pressure of gas or liquid could be applied to conduit 100 to reduce the pressure in chamber 18 and likewise cause the piston 73 and diaphragm 20 and plunger 26 to move downwardly again closing the valve.

When the actuating force is released or terminated, the springs 72 and 94 cause the plunger 26 and the piston 73 and diaphragm 20 to return to their rest positions, thus opening the valve.

The operation of the valve is quick but gentle. That is, the conical surface 50 closes against the valve seat 52 in a relatively short time once actuation has started, but not with such force as to cause deterioration of the surfaces 50 and 52. Thus, the surfaces 50 and 52 can operate for many cycles without pitting, scoring or other deterioration causing the valve to malfunction. This prolonged life of the valve can be mostly attributed to the gentle manner in which it is actuated by a change of fluid pressure action on the piston 73 and diaphragm 20. The diaphram 20 constitutes a sealing means for the piston 73.

Figure 2:
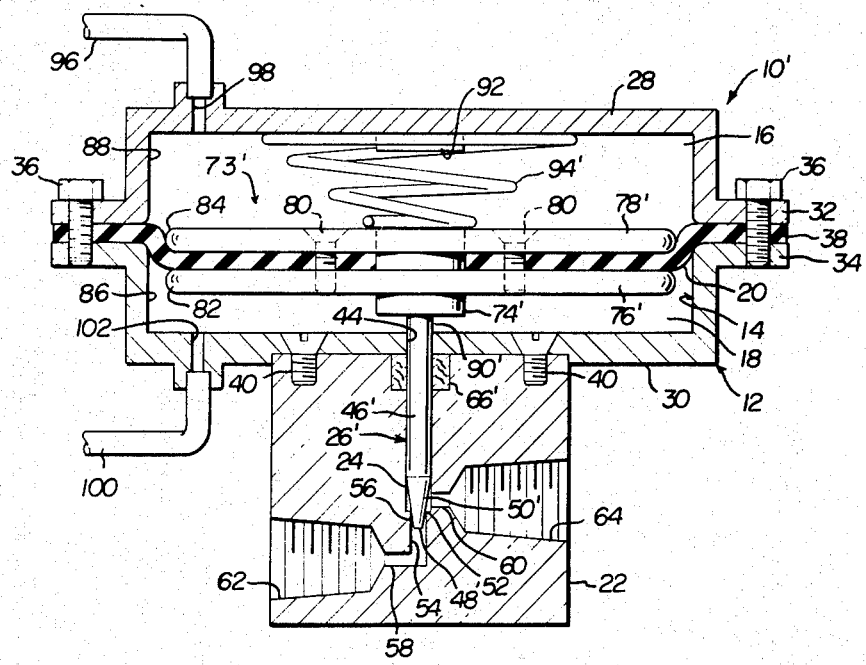
FIG. 2 is a vertical cross sectional view of a fluid operated needle valve in accordance with another embodiment of the invention, this embodiment being of a normally closed type.

The embodiment of FIG. 2 is almost identical to the embodiment of FIG. 1, and for this reason, the same reference numerals have been used for like parts. As previously mentioned, the difference is that the embodiment of FIG. 2 is a normally closed valve. In this embodiment, a few of the reference numerals have prime designations to indicate that they are slightly different than the corresponding elements in FIG. 1. For example, the coil spring 94' is in the upper chamber 16 and has its ends butting against the upper side of the disc 78 and the lower side of the cup 28. The coil spring 94' is normally under slight compression, so it forces the plunger 26' downwardly to engage the conical surface 50 with the valve seat 52. The plunger 26', including the valve stem 46', is integral with the piston body 74'. The cavity 42, the spring 72, the gland 68 and the head 51 of FIG. 1 are all omitted in FIG. 2. In FIG. 2, the packing 66' is compressed by the bottom of the cup 30. Thus, the packing 66' provides a seal for the valve stem 46'. The needle means 48' is constructed the same and has the same included angle as described above in connection with FIG. 1. The other elements of the valve may have substantially the same construction as described above in connection with FIG. 1.

The operation of the valve 10' of FIG. 2 is very similar to that described above. Fluid under pressure may be introduced through conduit 100 to chamber 18 so as to push the piston 73' and diaphragm 20 upward and raise the conical surface 50' from the valve seat 52 thus opening the valve. Alternatively, reduced pressure may be applied to conduit 96 to cause both the diaphragm 20 and the plunger 26' to rise, thus opening the valve. One, or the other, or both of the conduits 96 and 100 may be provided in a working valve.

Figure 3:
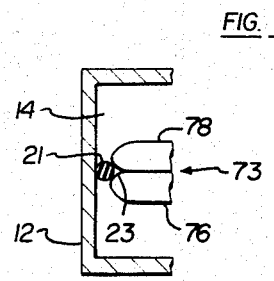
FIG. 3 is a fragmentary sectional view of a modification.

FIG. 3 illustrates a modification wherein the diaphragm 20 in either of the embodiments described previously is replaced by an O-ring 21 which encircles and hugs the piston 73 or 73'. The O-ring may seat in the groove 23 at the perimeter of the piston where the rounded edges of the discs 76 and 78 come together. Like the diaphragm 20, the O-ring 21 constitutes a sealing means for the piston 73 and 73', but the O-ring slidably engages the inner cylindrical surface of the chamber 14.

Figure 4:
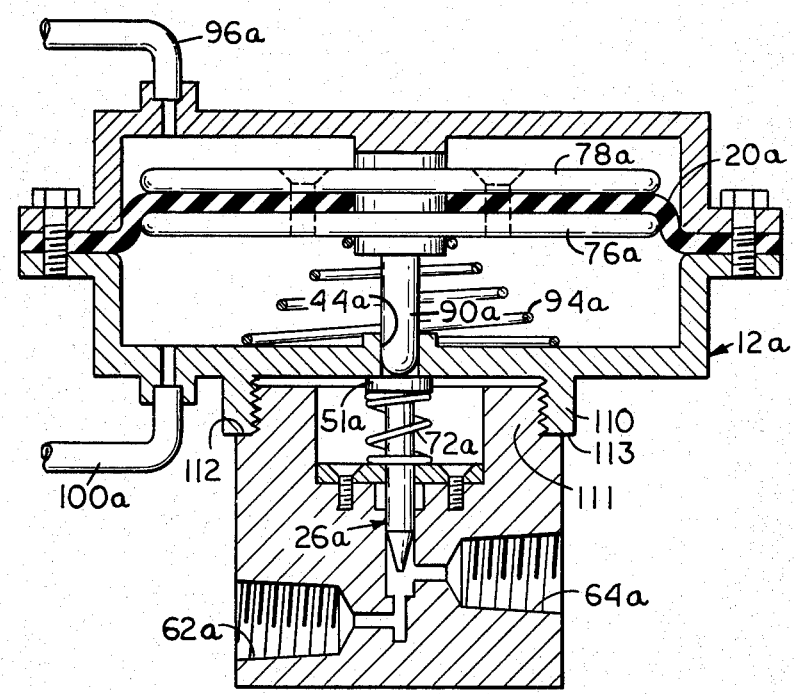
FIG. 4 is a vertical cross-sectional view of another embodiment of the present valve.

FIG. 4 illustrates another embodiment of the invention which is identical to the embodiment of FIG. 1 except in the manner of releasably attaching the two housings together. Corresponding elements in FIG. 4 are given the same reference numerals as in FIG. 1, but with an *a* suffix added, and the detailed description of these elements will not be repeated. In FIG. 4, the actuator housing 12a has a centrally located, annular flange 110 at the bottom which is internally screw-threaded. The upper end of the valve housing 22a is externally screw-threaded at 111 for screw-threaded, substantially fluid-tight insertion in the actuator housing flange 110. The valve housing presents an upwardly-facing, annular, flat shoulder 112 extending around the screw-threaded portion 111 for engagement by the bottom end face 113 on the actuator housing flange 110 when the two housings are assembled to each other. When the two housings are so assembled, the head 51a on the upper end of plunger 26a is biased by spring 72a up against the bottom of the actuator housing 12a around the opening 44a in the latter in the same manner as in the embodiment of FIG. 1.

Thus, the invention provides a fluid operated needle valve which combines the advantages of fluid actuation with the tight sealing characteristics of a needle valve closing element to provide a valve which will operate continuously under both high pressure and high temperature conditions without permitting any bypass and/or leakage of fluid. The valve has a relatively long operating life since it is resistant to deterioration of the needle and valve seat surface. This prolonged life can be partly attributed to the gentle action of the fluid on the actuator. The provision of the fluid-operated actuator in one housing and the needle valve element in another housing, that is releasably attached to the actuator housing, enables either the actuator assembly or the valve assembly to be repaired or replaced without disturbing the other.

I claim:
1. In a fluid operated needle valve comprising:
a valve housing having an inlet and an outlet and an annular valve seat between said inlet and said outlet, a conical needle valve element reciprocable in said housing toward and away from sealing engagement with said valve seat to control fluid flow between said inlet and said outlet;
a separate actuator housing releasably attached to said valve housing on the opposite side of said needle valve element from said valve seat, said actuator housing providing a fluid chamber, a fluid-displaceable actuator reciprocable in said fluid chamber between a retracted position away from said valve housing and an extended position toward said valve housing, fluid inlet and outlet means communicating with said fluid chamber for effecting movement of the actuator, and spring means in said actuator housing biasing said actuator to said retracted position;
the improvement wherein
said valve housing has a cavity therein which is open at its outer end at the side of the valve housing toward the actuator housing and is located on the opposite side of the needle valve element from said valve seat;
and said actuator housing has an end wall extending across said fluid chamber therein and extending flat across the open outer end of said cavity in the valve housing, said end wall having an opening therein leading into said cavity in the valve housing and aligned with said needle valve element and said valve seat;
and further comprising:
a valve stem connected to said needle valve element and extending therefrom into said cavity in the valve housing and terminating thereat in an enlarged head, spring means in said cavity engaged between the inner end of said cavity in the valve housing and said head to bias the latter outwardly against said end wall of the actuator housing and to position said needle valve element away from sealing engagement with said valve seat;
and a plunger attached to said fluid displaceable actuator and extending therefrom toward said end wall of the actuator housing and slidably received in said opening in said end wall in all positions of the actuator between said retracted and extended positions, said plunger in said retracted position of the actuator being retracted thereby to a position permitting said enlarged head on the valve stem to directly engage said end wall of the actuator housing around said opening in the latter, said plunger being engageable with said head on the valve stem to move the needle valve element toward the valve seat upon displacement of the actuator from its retracted position toward its extended position.

* * * * *